(12) United States Patent
Hamada

(10) Patent No.: US 7,830,050 B2
(45) Date of Patent: Nov. 9, 2010

(54) BRUSHLESS AUTOMOTIVE ALTERNATOR HAVING EASILY-REPLACEABLE PROTECTIVE RESISTOR

(75) Inventor: Hiroshi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 263 days.

(21) Appl. No.: 12/078,631

(22) Filed: Apr. 2, 2008

(65) Prior Publication Data
US 2008/0238268 A1    Oct. 2, 2008

(30) Foreign Application Priority Data
Apr. 2, 2007    (JP) .............................. 2007-096539

(51) Int. Cl.
*H02K 19/00*    (2006.01)
(52) U.S. Cl. .................................... 310/68 C
(58) Field of Classification Search ............... 310/68 D, 310/68 R, 68 C; 337/159–160, 163, 296
See application file for complete search history.

(56) References Cited
U.S. PATENT DOCUMENTS

| | | | | |
|---|---|---|---|---|
| 3,629,627 | A | * | 12/1971 | Dafler et al. .................. 310/44 |
| 3,836,883 | A | * | 9/1974 | Takayasu et al. ............ 337/163 |
| 4,221,982 | A | * | 9/1980 | Raver et al. ................... 310/59 |
| 5,681,495 | A | | 10/1997 | Tsuchiya et al. |

FOREIGN PATENT DOCUMENTS

| | | |
|---|---|---|
| JP | B-51-39793 | 9/1976 |
| JP | A-63-127501 | 5/1988 |
| JP | U-63-74066 | 5/1988 |
| JP | A-2-119559 | 5/1990 |
| JP | A 8-237999 | 9/1996 |
| JP | A-2002-101625 | 4/2002 |

OTHER PUBLICATIONS

"Product Information and Service Manual 33/34 SI Heavy Duty Brushless Alternator" Delco Remy International Inc., pp. 1-2, 1998.

* cited by examiner

*Primary Examiner*—Tran N Nguyen
(74) *Attorney, Agent, or Firm*—Oliff & Berridge, PLC

(57) ABSTRACT

A brushless alternator includes a stationary field winding, a rotor, a stator, a rectifier, a terminal, and a protective resistor. The stationary field winding creates a magnetic flux. The rotor creates a rotating magnetic field with the magnetic flux created by the field winding. The stator includes three different-phase windings to generate a three-phase AC power in the rotating magnetic field created by the rotor. The rectifier rectifies the three-phase AC power generated by the stator into a DC power. The terminal is provided so that AC power generated by one of the three windings of the stator can be output from the alternator to external through the terminal. The protective resistor is electrically connected between the terminal and the one of the three windings of the stator to protect the alternator from electrical damage.

4 Claims, 7 Drawing Sheets

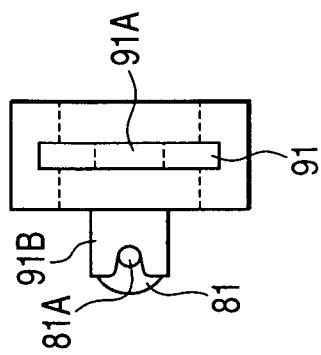
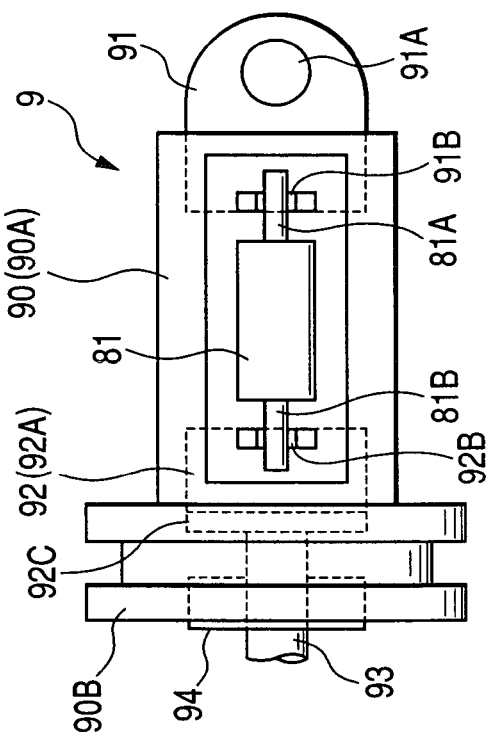
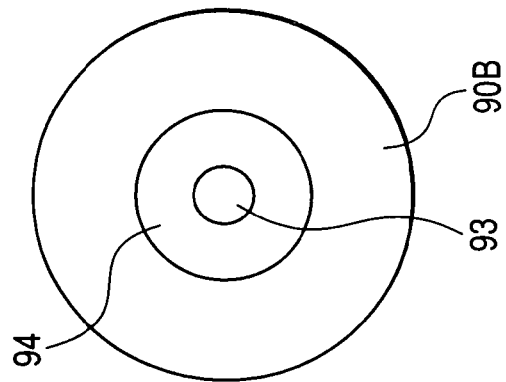
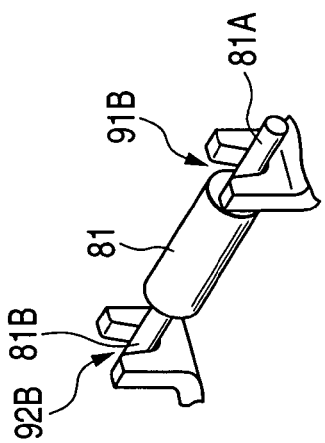

PRIOR ART

BRUSHLESS AUTOMOTIVE ALTERNATOR HAVING EASILY-REPLACEABLE PROTECTIVE RESISTOR

CROSS-REFERENCE TO RELATED APPLICATION

This application is based on and claims priority from Japanese Patent Application No. 2007-96539, filed on Apr. 2, 2007, the content of which is hereby incorporated by reference in its entirety into this application.

BACKGROUND OF THE INVENTION

1. Technical Field of the Invention

The present invention relates to brushless automotive alternators for use in, for example, trucks, construction machines, and agricultural machines.

2. Description of the Related Art

Automotive alternators are generally classified into two types. The first type is brushed type for passenger cars; the other is brushless type for trucks, which are generally required to travel long distances, and construction and agricultural machines which are generally required to operate under severe conditions (e.g., dusty conditions).

In particular, for a brushless automotive alternator used in a long-distance truck or a construction machine, a "one wire-charging system" is generally used for the purpose of minimizing the total length of necessary wires.

More specifically, in the one wire-charging system, as shown in FIG. 5, the brushless alternator 300 includes an output terminal B that is connected, via a single wire, to the plus (+) terminal of a battery 200 for charging it; at the same time, the brushless alternator 300 is grounded via a housing of the alternator 300.

Moreover, when the brushless alternator 300 further includes an indicator light terminal I, as shown in FIG. 5, the system is referred to as "one wire-charging system with terminal I" or "two-wire system". The terminal I is electrically connected, as shown in FIG. 6, between an auxiliary diode-trio 65 of the alternator 300 and an indicator light 150 on the vehicle, so as to drive the indicator light 150 with the electric power output from the auxiliary diode-trio 65.

The brushless alternator 300 further includes, as shown in FIGS. 5 and 6, a relay terminal R for outputting the electric power generated by one of the three different-phase stator windings of the alternator 300. The electric power output via the relay terminal R is used for various indicators, a tachometer, and an hour meter on the vehicle.

Conventionally, both the indicator light terminal I and the relay terminal R are made of a conductive metal plate, and directly connected to the auxiliary diode-trio 65 and the one of the stator windings, respectively.

Furthermore, as shown in FIG. 7, a fuse F is generally provided on the vehicle side (i.e., the opposite side to the terminal I with respect to the indicator light 150). When a vehicle-side wire connected to the terminal I is short-circuited with, for example, the vehicle body or an engine bracket, the fuse F will blow, thereby protecting the indicator light 150 and the alternator 300 from electrical damage.

However, referring back to FIG. 6, when conductive foreign matters accidently enter the inside of the alternator 300 to cause a short circuit between the terminals R and B, or when wires connected to the terminals R and B are short-circuited together outside the alternator 300 due to engine vibrations, electrical damage to the components of the alternator 300, such as the stator windings and diodes, is inevitable.

To solve the above problem, one may consider connecting one of the stator windings to the relay terminal R via an IC regulator 7 and configuring the IC regulator 7 to have a function of protecting the components of the alternator 300 from electrical damage in the above-described cases. However, this will require a redesign of the IC regulator 7 and thus considerably increase the manufacturing cost of the alternator 300.

In addition, as a related prior art, U.S. Pat. No. 5,681,495 discloses an automotive alternator for use in a passenger car, wherein the electric power generated by one of the three different-phase stator windings of the alternator is output via a multifunctional controller (or IC regulator). With this configuration, when a wire carrying the electric power generated by the one of the stator windings is short-circuited with, for example, the car body, the controller functions to protect the components of the alternator from electric damage.

SUMMARY OF THE INVENTION

The present invention has been made in view of the above-mentioned problems.

According to the present invention, there is provided a brushless alternator which includes a stationary field winding, a rotor, a stator, a rectifier, a terminal, and a protective resistor. The stationary field winding creates a magnetic flux. The rotor creates a rotating magnetic field with the magnetic flux created by the field winding. The stator includes three different-phase windings to generate a three-phase AC power in the rotating magnetic field created by the rotor. The rectifier rectifies the three-phase AC power generated by the stator into a DC power. The terminal is provided so that AC power generated by one of the three windings of the stator can be output from the alternator to external through the terminal. The protective resistor is electrically connected between the terminal and the one of the three windings of the stator to protect the alternator from electrical damage.

In particular, when the terminal is short-circuited with an electrical node, such as ground, the protective resistor is melted down by overcurrent. As a result, the one of the three windings of the stator is disconnected from the terminal, thereby protecting the stator and other components of the alternator from electrical damage. Moreover, after the occurrence of such a short circuit, it is possible to quickly repair the alternator only by replacing the protective resistor.

According to a further implementation of the invention, the protective resistor is joined to the terminal by soldering. Consequently, it is possible to more easily replace the protective resistor than the case where the protective resistor is joined to the terminal by other methods, such as welding.

Furthermore, the protective resistor is cylindrical in shape and has two leads respectively protruding from ends of the protective resistor. The terminal has formed therein two recesses that are spaced away from each other. The protective resistor is soldered to the terminal with the leads being respectively disposed in the recesses of the terminal. With this configuration, the protective resistor is provided in the terminal, and thus can be removed from the alternator together with the terminal. Consequently, in the removed state, the protective resistor can be more easily replaced.

In addition, the brushless alternator may be used in a motor vehicle.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 4A is a top view of a terminal of the brushless automotive alternator;

FIG. 4B is a left side view of the terminal;

FIG. 4C is a right side view of the terminal omitting a cylindrical portion of a resin member of the terminal;

FIG. 4D is a perspective view showing part of the terminal together with a protective resistor before soldering the protective resistor to the terminal;

DESCRIPTION OF PREFERRED EMBODIMENT

One preferred embodiment of the present invention will be described hereinafter with reference to FIGS. 1-4.

Figure 1:
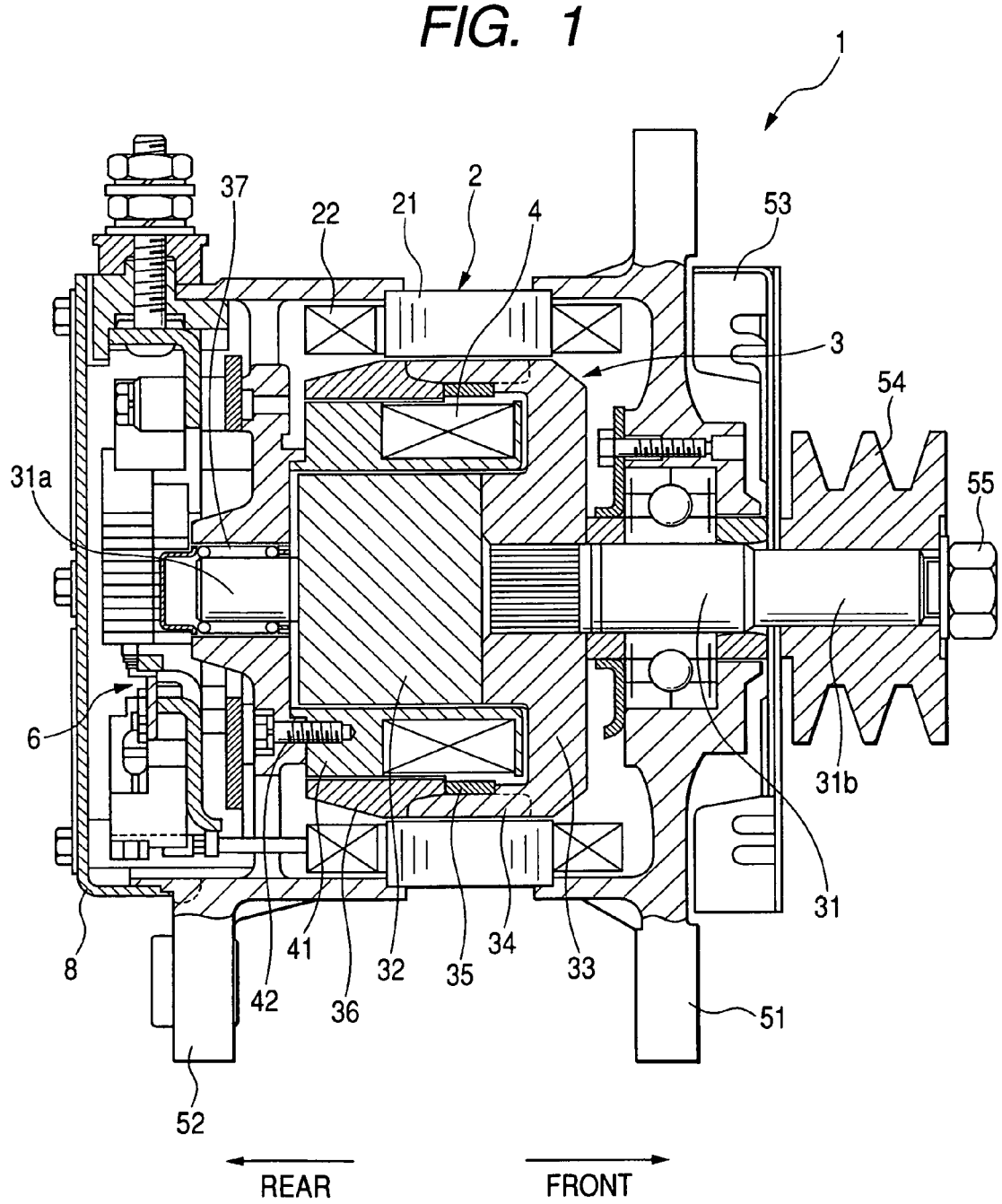
FIG. 1 is a partially cross-sectional side view showing the overall configuration of a brushless automotive alternator according to an embodiment of the invention.
Figure 2:
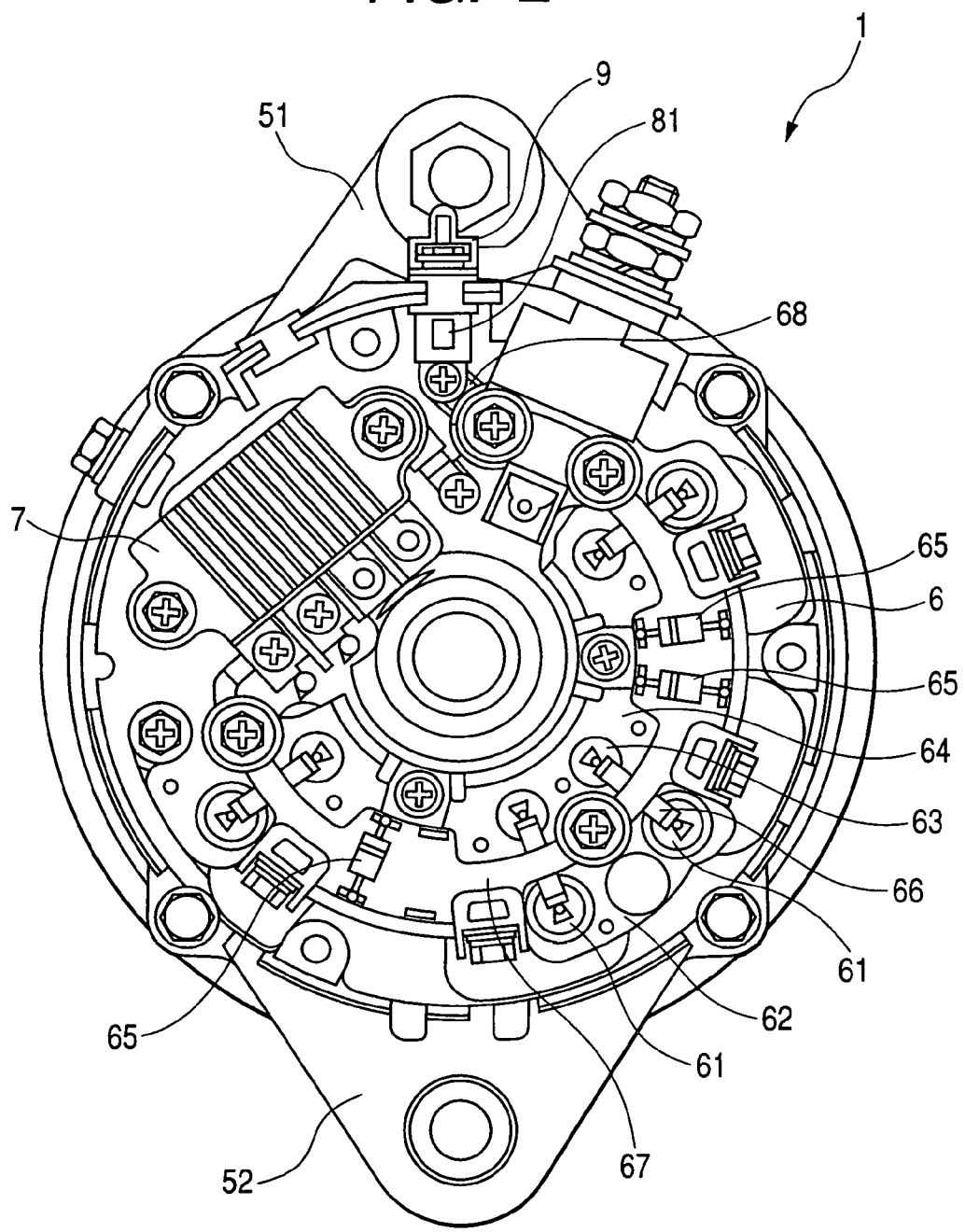
FIG. 2 is a rear end view of the brushless automotive alternator omitting a rear cover of the alternator.

FIGS. 1 and 2 together show the overall configuration of a brushless automotive alternator 1 according to an embodiment of the invention.

As shown, the alternator 1 includes a stator 2, a rotor 3, a field winding 4, a front housing 51, a rear housing 52, a rectifier 6, an IC regulator 7, a rear cover 8, a relay terminal (to be shortly referred to as R terminal hereinafter) 9, and a protective resistor 81.

The stator 2, which functions as an armature, includes a stator core 21 and three different-phase stator windings 22 that are wound around the stator core 21.

The rotor 3, which functions as a field, is arranged so as to be surrounded by the stator 2. The rotor 3 includes a rotary shaft 31, rotating yoke portions 32 and 33 that are mounted on the rotary shaft 31, a claw pole portion 34 formed integrally with the rotating yoke portion 33, and a claw pole portion 36 that is connected to the claw pole portion 34 through an annular supporting member 35. Moreover, the rotary shaft 31 is rotatably supported by a bearing 37 that is arranged around a rear end portion 31*a* of the rotary shaft 31.

The field winding 4 is wound around a fixed yoke portion 41. The fixed yoke portion 41 is cylindrical in shape and fixed to the rear housing 52 by means of bolts 42.

The filed winding 4, the fixed yoke portion 41, and the rotor 3 together constitute the field. More specifically, the field winding 4 creates a magnetic flux when energized; with this magnetic flux, the rotor 3 creates a rotating magnetic field which induces three-phase AC current in the stator windings 22 of the stator 2.

The front and rear housings 51 and 52 are provided to house and support the stator 2 and rotor 3. The above-described bearing 37 is press-fitted in a bore formed in the rear housing 52, and is thereby fixed to the rear housing 52. On the other hand, from the front housing 51, a front end portion 31*b* of the rotary shaft 31 protrudes so as to allow a cooling fan 53 and a pulley 54 to be mounted thereon by means of a nut 55.

Figure 3:
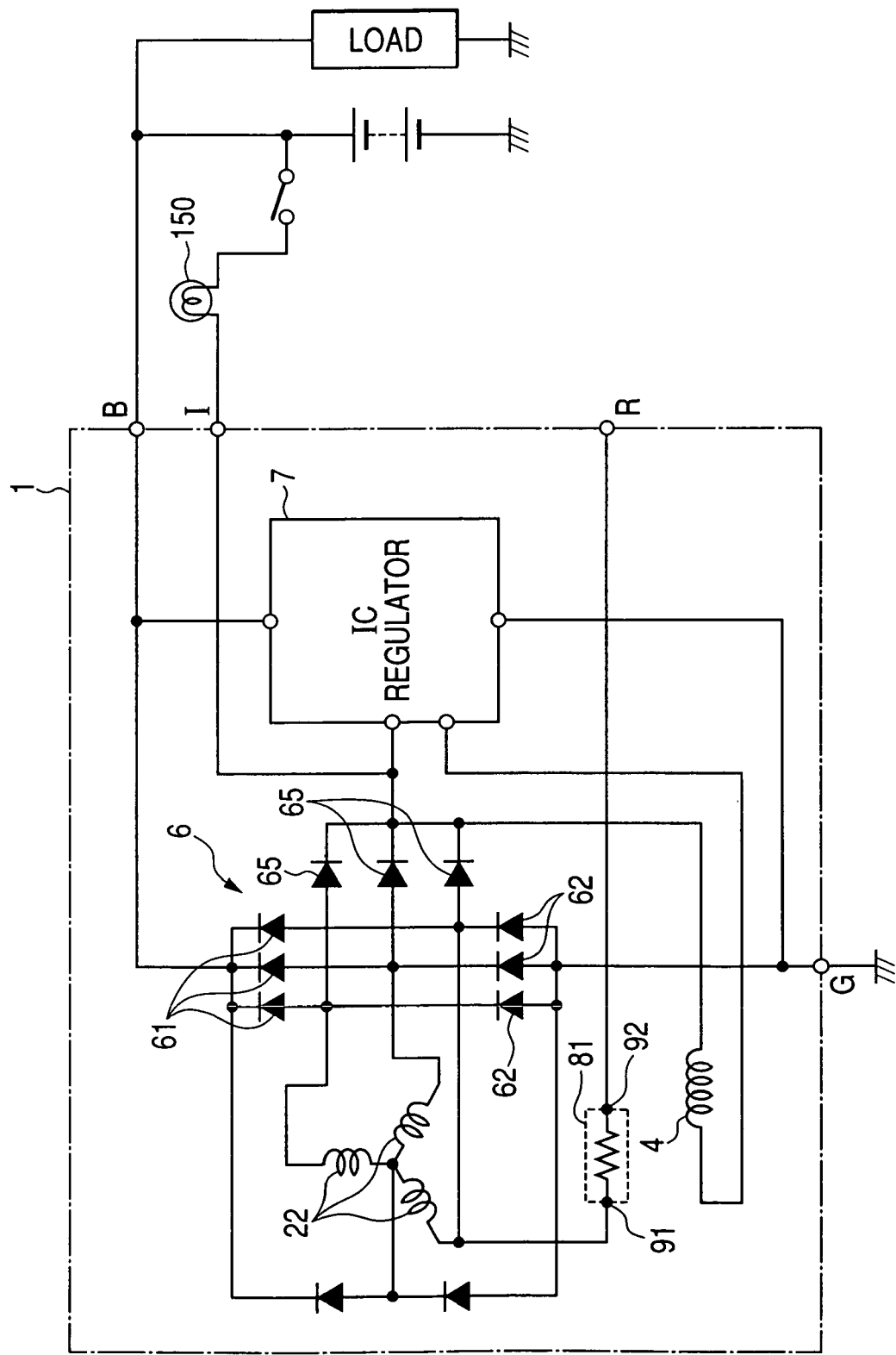
FIG. 3 is a circuit diagram of the brushless automotive alternator.
Figure 5:
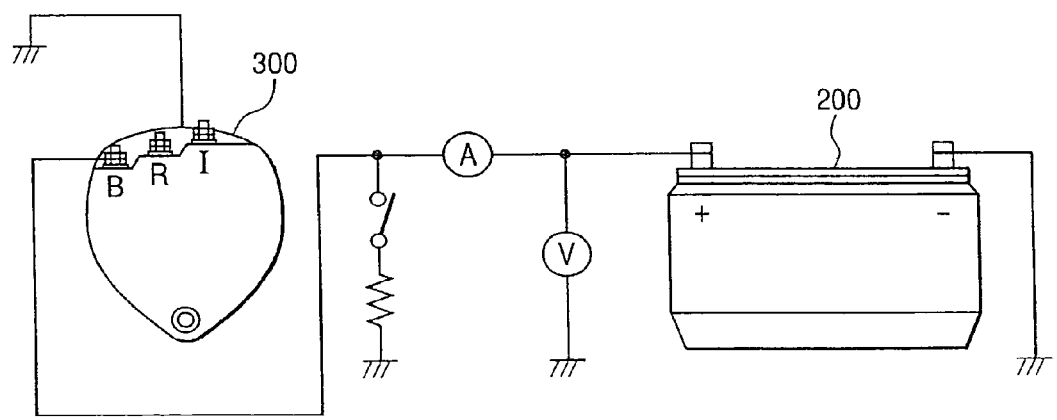
FIG. 5 is a schematic view illustrating electrical connection for a conventional brushless automotive alternator.
Figure 6:
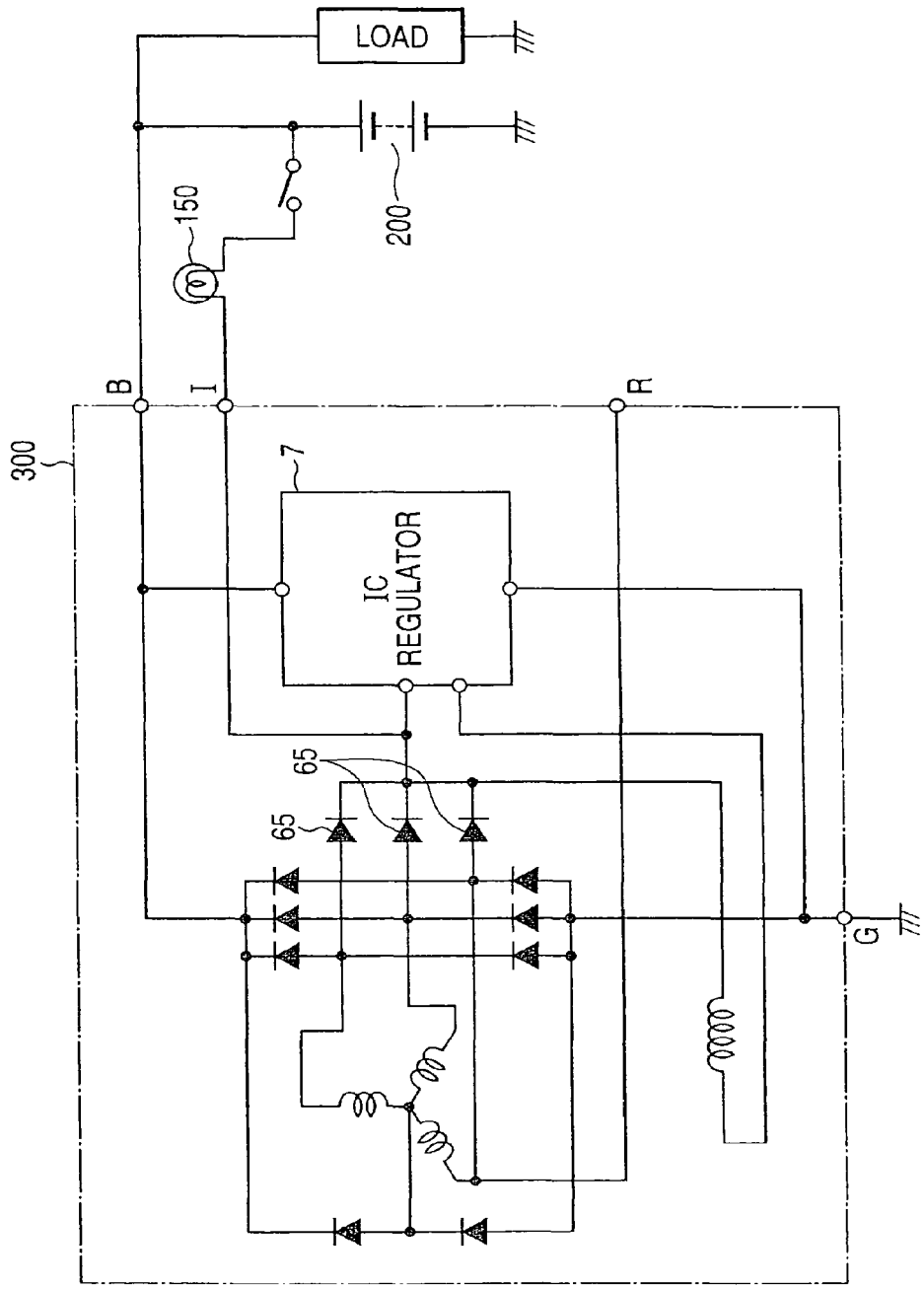
FIG. 6 is a circuit diagram of the conventional brushless automotive alternator.
Figure 7:
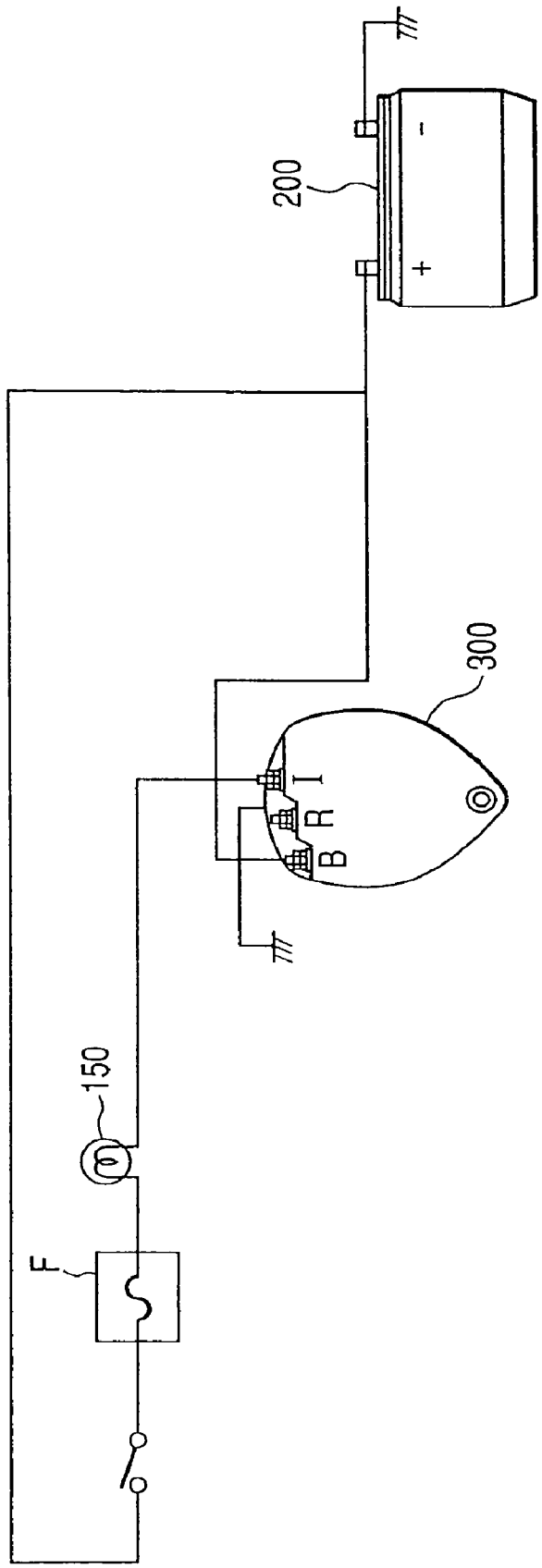
FIG. 7 is a schematic view illustrating a fuse provided on the vehicle side in the electrical connection for the conventional brushless automotive alternator.

The rectifier 6 functions to full-wave rectify three-phase AC power output from the stator windings 22. More specifically, as shown in FIGS. 2 and 3, the rectifier 6 includes a plurality of positive-side diodes 61, a positive-side heat sink 62 that holds the positive-side diodes 61 to dissipate heat generated by the diodes 61, a plurality of negative-side diodes 63, a negative-side heat sink 64 that holds the negative-side diodes 63 to dissipate heat generated by the diodes 63, an auxiliary diode-trio 65 for supplying field current to the field winding 4, a plurality of terminals 66 each for connecting an adjacent pair of one positive-side diode 61 and one negative-side diode 63, and a terminal block 67 that holds both the auxiliary diode-trio 65 and the terminals 66. In addition, there is also provided, on the terminal block 67, a terminal 68 for mounting the terminal R 9 to the terminal block 67.

The IC regulator 7 functions to regulate the output voltage of the alternator 1 by controlling the field current supplied to the field winding 4.

The rear cover 8 is fixed to the rear housing 52 to cover the rectifier 6 and the regulator 7 from a rear side of the alternator 1, thereby protecting them from foreign matter, such as water and dust.

The R terminal 9 is provided to output the electric power generated by one of the three different-phase stator windings 22 of the stator 2 to external devices or circuits.

In the present embodiment, as shown in FIGS. 4A-4D, the R terminal 9 includes a resin member 90, first and second terminal electrodes 91 and 92, a bolt 93, and a metal flange 94.

The resin member 90 includes a receiving portion 90A and a cylindrical portion 90B. The receiving portion 90A has the shape of an open box, in which the protective resistor 81 is received. The cylindrical portion 90B holds therein the bolt 93, the metal flange 94, and part of the second terminal electrode 92.

The first terminal electrode 91 has a substantially "L" shape to include a bottom wall and a side wall. The bottom wall has a portion protruding from the receiving portion 90A of the resin member 90, leaving the other portion on the inner end surface of the receiving portion 90A. Further, on the protruding portion of the bottom wall, there is formed a through-hole 91A for fixing the R terminal 9 to the terminal 68 of the terminal block 67. On the other hand, the side wall stands on the inner end surface of the receiving portion 90A; it has a "U"-shaped recess 91B in which a lead 81A drawn from one end of the protective resistor 81 is received.

The second terminal electrode 92 has a substantially "U" shape to include a bottom wall and first and second side walls. The bottom wall is disposed on the inner end surface of the receiving portion 90A. The first side wall stands on the inner end surface of the receiving portion 90A; it has a "U"-shaped recess 92B in which a lead 81B drawn from the other end of the protective resistor 81 is received. The second side wall is embedded in the cylindrical portion 90B of the resin member 90, and fixed to the bolt 93 inside the cylindrical portion 90B.

In the present embodiment, the protective resistor 81 is fixed to the R terminal 9 by: 1) crimping the side wall of the first terminal electrode 91 and the first side wall of the second terminal electrode 92 respectively onto the leads 81A and 81B; 2) soldering the leads 81A and 81B respectively to the side walls of the first and second terminal electrodes 91 and 92. It should be noted that it is also possible to fix the protective resistor 81 to the R terminal 9 without performing the crimping step.

The bolt 93 has a portion protruding from the cylindrical portion 90B of the resin member 90, leaving the other portion in the cylindrical portion 90B so as to be connected to the second terminal electrode 92. To the protruding portion of the bolt 93, wires drawn from the external devices or circuits are to be fixed.

The metal flange 94 is provided to secure strength of the R terminal 9 when the wires are fixed to the bolt 93 by fastening a nut onto the bolt 93.

The protective resistor 81 is cylindrical in shape and has the leads 81A and 81B respectively protruding from the ends thereof. The protective resistor 81 is, referring back to FIG. 3, electrically connected between the R terminal 9 and the one of the stator windings 22 of the stator 2 to protect the alternator 1 from electrical damage. More specifically, when a wire connected to the bolt 93 of the R terminal 9 is short-circuited with an electrical node, such as ground G, the protective resistor 81 will be melted down by overcurrent, thereby disconnecting the one of the stator windings 22 from the R terminal 9. As a result, the stator windings 22 and the diodes 61 and 63 of the alternator 1 can be protected from electrical damage.

In addition, supposing that the protective resistor 81 is melted down when its power consumption has reached 0.05 W, it is necessary to set the protective resistor 81 to approximately 11 kΩ with the battery voltage being 24 V.

Furthermore, wires connecting the R terminal 9 to the one of the stator windings 22 may be short-circuited with, for example, the rear housing 52 due to conductive foreign matter that has accidently entered the inside of the alternator 1. Therefore, it is preferable to minimize the total length of the wires connecting the R terminal 9 to the one of the stator windings 22. In the present embodiment, the total length of the wires is minimized by fixing the terminal electrode 91 of the R terminal 9 directly to the terminal 68 of the terminal block 67 of the rectifier 6.

After having described the overall configuration of the brushless automotive alternator 1 according to the present embodiment, the advantages thereof will be described hereinafter.

In the present embodiment, the alternator 1 is configured to include the protective resistor 81 between one of the stator windings 22 of the stator 2 and the R terminal 9 for outputting the electric power generated by the one of the stator windings 22 to external devices or circuits.

With the above configuration, when wires connected to the R terminal 9 are short-circuited either outside the alternator 1 due to, for example, engine vibrations or inside the alternator 1 due to, for example, conductive foreign matters, the protective resistor 81 will be melted down by overcurrent. As a result, the one of the stator windings 22 is disconnected from the R terminal 9, thereby protecting the stator windings 22 and the diodes 61 and 63 from electrical damage.

Moreover, after the occurrence of such a short circuit as described above, it is possible to quickly repair the alternator 1 only by replacing the melted-down resistor 81 with a new one.

In the present embodiment, the protective resistor 81 is joined to the R terminal 9 by soldering. Consequently, it is possible to more easily replace the protective resistor 81 than the case where the protective resistor 81 is joined to the R terminal 9 by other methods, such as welding.

In the present embodiment, the protective resistor 81 has the shape of a cylinder with the leads 81A and 81B respectively protruding from the ends thereof. The R terminal 9 includes the terminal electrodes 91 and 92 in which are respectively formed the recesses 91B and 92B. The protective resistor 81 is soldered to the R terminal 9 with the leads 81A and 81B being respectively disposed in the recesses 91B and 92B. With this configuration, the protective resistor 81 is provided in the R terminal 9, and thus can be removed from the alternator 1 together with the R terminal 9. Consequently, in the removed state, the protective resistor 81 can be more easily replaced.

While the above particular embodiment of the invention has been shown and described, it will be understood by those skilled in the art that various modifications, changes, and improvements may be made without departing from the spirit of the invention.

For example, in the previous embodiment, the protective resistor 81 is joined to the R terminal 9 by soldering.

However, when there is a sufficient room in the receiving portion 90A of the resin member 90 of the R terminal 9, the protective resistor 81 may also be joined to the R terminal 9 by means of screws, thereby further facilitating the replacement of the protective resistor 81.

Moreover, it is also possible to join the protective resistor 81 to the R terminal 9 by welding, though the efficiency of the replacement of the protective resistor 81 is decreased.

What is claimed is:

1. A brushless alternator comprising:
   a stationary field winding that creates a magnetic flux;
   a rotor that creates a rotating magnetic field with the magnetic flux created by the field winding;
   a stator including three different-phase windings to generate a three-phase AC power in the rotating magnetic field created by the rotor;
   a rectifier that rectifies the three-phase AC power generated by the stator into a DC power;
   a terminal through which AC power generated by one of the three windings of the stator is to be externally output from the alternator; and
   a protective resistor that is electrically connected between the terminal and the one of the three windings of the stator to protect the alternator from electrical damage;
   wherein the protective resistor is configured to be melted down by overcurrent when the terminal is short-circuited with an electrical node.

2. The brushless alternator as set forth in claim 1, wherein the protective resistor is joined to the terminal by soldering.

3. The brushless alternator as set forth in claim 2, wherein the protective resistor is cylindrical in shape and has two leads respectively protruding from ends of the protective resistor,
   the terminal has formed therein two recesses that are spaced away from each other, and
   the protective resistor is soldered to the terminal with the leads being respectively disposed in the recesses of the terminal.

4. The brushless alternator as set forth in claim 1, wherein the brushless alternator is designed for use in a motor vehicle.

* * * * *